Aug. 25, 1931.   S. H. CAMPBELL ET AL   1,820,556
BOLT
Filed Jan. 28, 1931
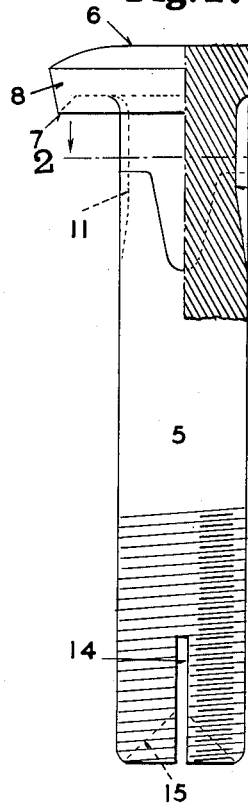
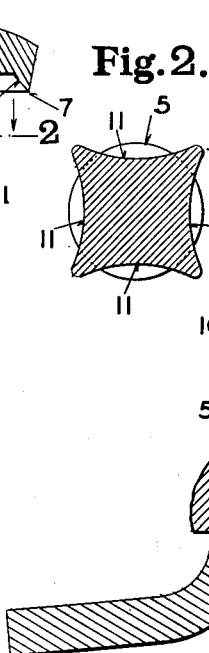
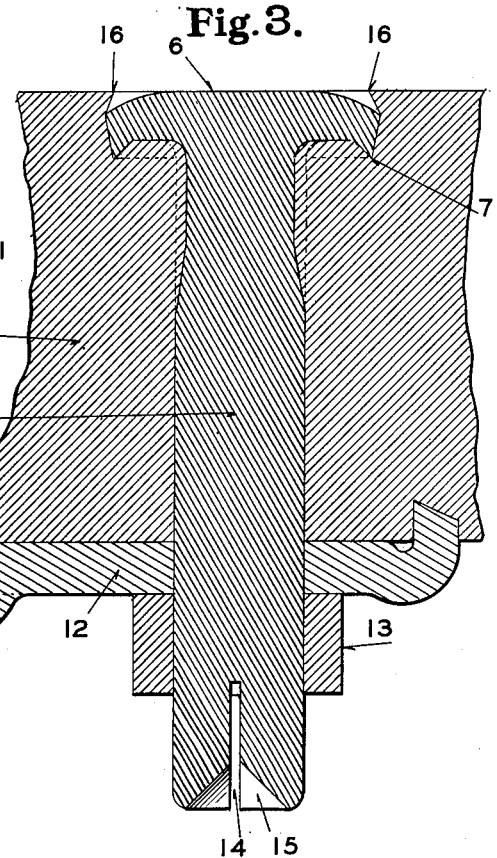
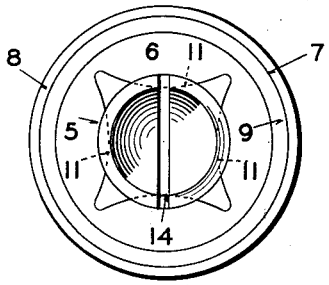
Inventors
S. H. Campbell
F. K. Habenicht
By E. E. Huffman
Att'y.

Patented Aug. 25, 1931

1,820,556

UNITED STATES PATENT OFFICE

STERLING H. CAMPBELL AND FREDERICK K. HABENICHT, OF ST. LOUIS, MISSOURI, ASSIGNORS TO WESTERN RAILWAY EQUIPMENT COMPANY, OF ST. LOUIS, MISSOURI, A CORPORATION OF MISSOURI

BOLT

Application filed January 28, 1931. Serial No. 511,686.

Our invention relates to a bolt and particularly to a bolt adapted to be applied to timber structures such, for example, as the sheathing on flooring of railway cars. One object of our invention is to so form the head of the bolt that it may readily be drawn into the timber to which it is applied so as to be flush with the face thereof.

Another object of our invention is to provide means for securing a tight joint between the timber and both the head and the shank of the bolt, the joint between the shank of the bolt and the timber being of such form as to effectively resist rotation of the bolt in the timber while it is being drawn into position.

Still another object of our invention is to provide improved means for locking a nut in position on the bolt.

In the accompanying drawings, which illustrate one form of bolt made in accordance with our invention, Figure 1 is a side view, partly in section; Figure 2 is a cross section taken on the line 2—2 of Figure 1; Figure 3 is a vertical section showing the bolt in position in a piece of timber; and Figure 4 is a bottom plan view.

The bolt comprises a threaded shank 5 and a head 6. The head, which is preferably circular in form, is provided at its periphery with a downwardly projecting cutting edge 7. The exterior face 8 of the edge is inclined inwardly at a slight angle to the axis of the bolt and terminates somewhat below the top of the head, the circumference of the head being relieved above the face by chamfering or rounding, as shown. The interior face 9 of the cutting edge is inclined in the opposite direction from the face 8 and at a somewhat greater angle to the axis. In order to prevent the rotation of the bolt as it is drawn into the piece of timber 10 to which it is applied, the shank immediately below the head is formed approximately square but having faces concave instead of flat so as to provide locking recesses 11 extending inwardly beyond the periphery of the body of the bolt, as best shown in Figure 2.

Figure 3 shows the bolt applied to a floor board of a railway car in order to secure thereto a retaining clip 12 by engagement of the latter with a nut 13 on the threaded end of the bolt. Formed in the end of the bolt is a slot 14 so that the bolt may be spread. As is fully explained in Patent No. 1,626,596 granted to S. H. Campbell May 3, 1927, the application of a nut to a split bolt tends to close the slot and render difficult or impossible the insertion of a spreading tool. To overcome this difficulty we form in the end face of the shank a cone-shaped depression 15 which will receive the spreading tool even if the slot is completely closed by the application of the nut. One advantage of this manner of providing slot opening means is that the conical depression may be formed at the same operation by which the edge of the bolt end is rounded to facilitate its engagement with the threading tool and, therefore, it does not increase the manufacturing cost of the bolt. Another advantage is that it neither materially weakens the bolt nor decreases its effective length.

In using our bolt it is inserted through a circular hole in a piece of timber, as the floor board 10, and through the part to be attached thereto, as the clip 12, and the nut 13 is screwed onto its end. As the part of the shank bounded by the concave faces 11 projects below the cutting edge, it will enter the timber before said edge and provides means for preventing the rotation of the bolt as the nut is tightened. As the head is drawn into the wood the tendency of the bolt to turn with the nut becomes increasingly greater owing to the increased resistance of the compressed wood. At the same time that the inner face 9 of the cutting edge acts to move the wood within it toward the shank, thus compressing it and forcing it into the locking recesses formed by the faces 11. This increases the resistance to the rotation of the bolt as its tendency to rotate increases so that in practice we find no difficulty in drawing the head into the board until it is flush with its surface, as shown in Figure 3.

As the head is drawn into the board the outer face 8 of the cutting edge compresses the surrounding wood but, as this compression is slight owing to the slight angle of the face to the axis of the bolt, such compression is not sufficient to crush or permanently distort the fiber of the wood. After the head has been drawn in flush with the faces of the board the portion of the compressed wood which extends above the termination of the face 8 expands, forming an over-hanging annular lip 16 projecting into the space formed by relieving the edge of the head. This lip materially assists in forming a water-tight joint between the bolt and the timber to which it is applied.

Having full described our invention, what we claim as new and desire to secure by Letters Patent of the United States is:

A self-countersinking bolt for application to timber having an integral threaded shank and head, the periphery of said head being provided with a downwardly projecting cutting edge the exterior face of which is inwardly and downwardly inclined at a slight angle to the axis of the bolt, whereby the surrounding wood is compressed without crushing, said periphery terminating in a plane below the highest point of the head, said head being relieved above said plane to permit expansion of a portion of the material compressed by said cutting edge, the interior face of said cutting edge being inclined in a direction opposite to the exterior face, and the shank being provided with locking recesses into which the material of the timber is forced by the action of the interior face of said cutting edge, said locking recesses extending inwardly beyond the periphery of the body of the shank.

In testimony whereof, we hereunto affix our signatures, this the 24th day of January, 1931.

STERLING H. CAMPBELL.
FREDERICK K. HABENICHT.